W. M. DOTY.
Lifting-Jacks.

No. 156,725.

Patented Nov. 10, 1874.

Attest:
E. R. Doty
F. M. Doty

Inventor:
Wm M. Doty

UNITED STATES PATENT OFFICE.

WILLIAM M. DOTY, OF JANESVILLE, WISCONSIN.

IMPROVEMENT IN LIFTING-JACKS.

Specification forming part of Letters Patent No. 156,725, dated November 10, 1874; application filed March 26, 1874.

*To all whom it may concern:*

Be it known that I, WILLIAM M. DOTY, of the city of Janesville, county of Rock and State of Wisconsin, have invented a new and Improved Implement for Lifting Wagon and Carriage Axles; and I do hereby declare that the following is a full description of the same, reference being had to the accompanying drawings, in which—

Figure 1:
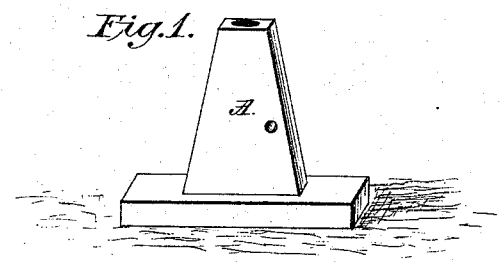
Figure 2:
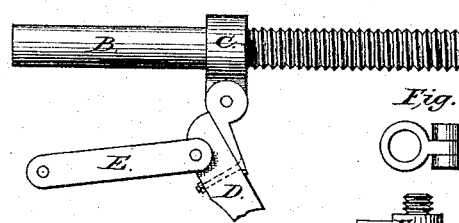
Figure 3:
Figures 4, 5:
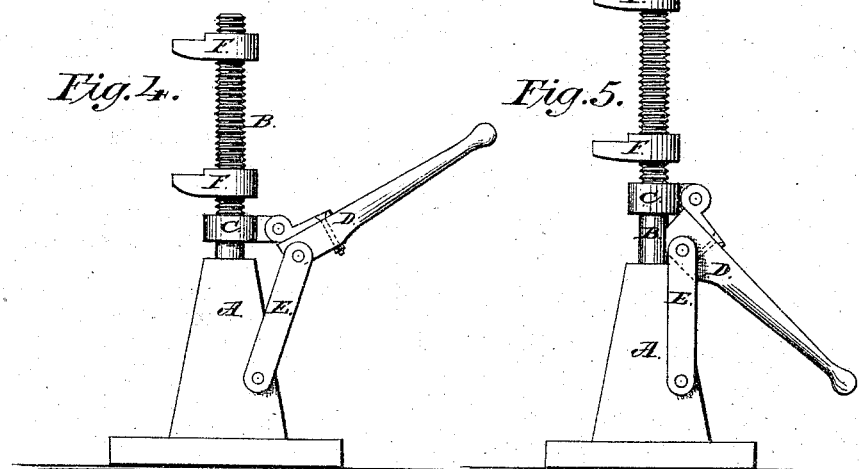

Figure 1 represents the base and standard A, perforated vertically for the insertion of the lifting-bar B, Fig. 2. Fig. 2 represents the spirally-threaded lifting-bar B clasped by the socket of the socket-hinge C; also, a portion of the lever D, with the oscillating arms E attached. Fig. 3 represents the socket-hinge, constructed especially for service in this implement, as shown in Figs. 4 and 5. Fig. 4 represents the various parts of the entire implement, including the adjustable nut-rests F F, threaded to rise and fall on the lifting-bar B, by turning as nuts on a screw, in proper position for lifting the axle. Fig. 5 represents the implement with the lever depressed, in which position the pivot of the upper ends of the oscillating arms falls within the line of pressure between the fulcrum in the socket-hinge C and the pivot at the lower end of the arms E, thus being self-fastening.

Similar letters of reference indicate corresponding parts in the several figures.

The advantages of this new device are, simplicity, power, cheapness, and convenience for those having but one vehicle, it being readily adjusted to both axles, after which no adjustment of any kind is required until a change of vehicle.

What I claim as new, and desire to secure by Letters Patent, is—

The combination of the base A, lifting-bar B, lever D, and threaded nut-rest F, as and for the purpose set forth.

WM. M. DOTY.

Witnesses:
T. M. DOTY,
E. R. DOTY.